(12) United States Patent
Leister

(10) Patent No.: US 8,482,828 B2
(45) Date of Patent: Jul. 9, 2013

(54) HOLOGRAPHIC IMAGING DISPLAY WITH CORRECTED PHASE CODING

(75) Inventor: Norbert Leister, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 855 days.

(21) Appl. No.: 12/530,514

(22) PCT Filed: Mar. 3, 2008

(86) PCT No.: PCT/EP2008/052563
§ 371 (c)(1),
(2), (4) Date: Jan. 7, 2010

(87) PCT Pub. No.: WO2008/110476
PCT Pub. Date: Sep. 18, 2008

(65) Prior Publication Data
US 2010/0118359 A1    May 13, 2010

(30) Foreign Application Priority Data
Mar. 9, 2007    (DE) .......................... 10 2007 012 865

(51) Int. Cl.
*G03H 1/08*    (2006.01)
*G03H 1/16*    (2006.01)

(52) U.S. Cl.
USPC ................................................. 359/9; 359/29

(58) Field of Classification Search
USPC .......................................................... 359/9, 29
See application file for complete search history.

(56) References Cited

U.S. PATENT DOCUMENTS
2010/0271675 A1* 10/2010 Leister et al. .................... 359/9

FOREIGN PATENT DOCUMENTS
DE    10 2006 003 741    8/2007
WO    WO 2006/066919    6/2006
WO    WO 2006/119760    11/2006

OTHER PUBLICATIONS

International Search Report, dated Jun. 19, 2009, issued in priority International Application No. PCT/EP2008/052563 (in German).
Mait et al., "Dual-phase holographs: improved design," Applied OPtics, OSA Optical Society of America, Washington, DC, vol. 26, No. 22, pp. 4883-4892 (Nov. 15, 2987) SP007902.
Sinclair et al., "Interactive application in holographic optical tweezers of a multi-plane Gerchberg-Saxton algorithm for three-dimensional light shaping," Optics Express, vol. 12, No. 8, pp. 1665-1670 (Apr. 19, 2004).

* cited by examiner

*Primary Examiner* — Alessandro Amari
(74) *Attorney, Agent, or Firm* — Saul Ewing LLP

(57) ABSTRACT

A holographic projection display for reconstructing a 3D-scene and a coding method that indicates an improvement of the control value of coding through an iterative Fourier transformations-algorithm are disclosed. The display includes a reproduction system including at least two reproducing means. First reproduction means for reproducing the illuminating means and for the Fourier transformation of actual wave fronts modulated in the phase modulator follow a second reproduction means, that functions as a screen. The plane of the screen is a Fourier transformation plane for calculations with the iterative Fourier transformation-algorithm and the plane of the phase modulator is the other Fourier transformation plane.

17 Claims, 5 Drawing Sheets

HOLOGRAPHIC IMAGING DISPLAY WITH CORRECTED PHASE CODING

CROSS REFERENCE TO RELATED APPLICATIONS

This application claims the priority of PCT/EP2008/052563, filed on Mar. 3, 2008, which claims priority to German Application No. 10 2007 012 865.9, filed Mar. 9, 2007, the entire contents of which are hereby incorporated in total by reference.

BACKGROUND OF THE INVENTION

The present invention relates to a holographic imaging display which is used to image a wave front of a three-dimensional scene (3D scene), said wave front being encoded on a phase modulator, into a visibility region in an observer plane, where its reconstruction can be seen from an eye position.

The invention also relates to a method which allows the wave front of the 3D scene to be encoded by way of phase encoding and then to be reconstructed in the holographic imaging display. The method also includes an iterative improvement of the control values for encoding.

The reconstruction quality of a 3D scene in a holographic display device is affected by a number of factors. Reconstruction errors are caused for example by the effects of disturbing light of other diffraction orders, which is why those diffraction orders must be suppressed. Other errors in the reconstruction are caused by the encoding method which is used, in combination with the components used, e.g. an amplitude-modulating or a phase-modulating spatial light modulator.

The thus far unpublished patent application DE 10 2006 003 741 filed by the applicant describes a method of encoding a computer-generated hologram (CGH) of a three-dimensional object based on the phase encoding principle, and a holographic display device used to implement that method. The method is based on the principle that a complex-valued reference wave front of the three-dimensional object, which is computed and summed up in the visibility region for example from transformations of section planes of the 3D scene or by another equivalent method executed in the visibility region, is stored in a processor with for example electronic means.

Object data sets contain complex phase and amplitude values of a multitude of object points in the individual object planes and thus the entire object information of the three-dimensional object. The complex-valued hologram data, which are computed from the object data sets, encode a spatial light modulator (SLM), which is capable of influencing by electronic control the amplitude and phase of light which is able to interfere. The three-dimensional object can thus be fully reconstructed from those data. The reconstruction can be seen from a visibility region if at least one eye of an observer is situated there. The three-dimensional object can either be a still object or a sequence of moving images (3D scene) of a real or virtual representation. In earlier documents filed by the applicant, this visibility region was compared with an observer window, and it also used to be referred to as such. As far as the present invention is different to the patent application mentioned above, this will be explained in more detail in the description.

Document DE 10 2006 003 741 relates to a method which is used to improve the process of encoding a CGH by way of two-phase encoding in a phase modulator. That method is described with the help of a holographic display device where an optical transformation of the wave front—which corresponds e.g. with a Fresnel transformation or with a Fourier transformation—takes place from the phase modulator into the visibility region. However, the holographic display device lacks adequate means to image the wave front from the phase modulator into the visibility region with a subsequent reconstruction of the wave front. The phase modulator contains encoded phase values, while the computed wave front in the visibility region is not merely a phase function, but comprises changing absolute values. However, in order to realise a imaging despite this, optical means must be added and/or existing ones must be modified accordingly.

A phase modulator, or phase-modulating SLM, is an electronic medium which serves to control the phase of a wave front by way of modulating an illuminating wave front emitted by one or multiple independent light sources. It consists of a multitude of electronically controllable pixels which are arranged in a regular pattern, in which a wave front or a CGH of the 3D scene is encoded. The reconstruction of the 3D scene is generated by diffraction of sufficiently coherent light at the controllable pixels.

When using a phase-modulating SLM, greater brightness of the reconstruction can be achieved compared for example with an amplitude-modulating SLM, because the pixels exhibit maximum transmittance. Another advantage of phase encoding is better wavelength dependence, because the object is reconstructed in the zeroth diffraction order of the used light, so that colour holograms can be represented better.

The method of phase encoding is generally based on the principle that a complex value can be represented by at least two phase values as complex numbers with the absolute value 1 for the amplitude. These phase values are encoded in adjacent pixels of the SLM. For example, a complex value with the phase $\psi$ and the amplitude a ranging between 0 and 1 is thus written according to the two-phase-encoding method as phase $1=\psi+a\cos a$ and phase $2=\psi-a\cos a$.

Phase encoding can be realised with k phase values each in adjacent pixels of the phase modulator, where these adjacent pixels can lie below one another and/or side by side. This is why it can generally be referred to as a phase encoding with k components.

However, it is generally also thinkable to express a number of complex values in any other way by two or more phase values per complex value. While the two-phase encoding method is used as an example in the description below, the explanations given typically also apply to a more general encoding with k phase values.

If it was possible to encode multiple phase values at one and the same position on the SLM in order to represent phase values, a thus encoded CGH would make it achievable to reconstruct the 3D scene free of errors. In practice, however, the phase values can only be written to two horizontally and/or vertically adjacent controllable pixels of the phase-modulating SLM, so that they exhibit a local offset. That offset causes errors in the reconstruction of the 3D scene. This is why measures to improve the reconstruction quality are necessary so that one can benefit from the advantages of the two-phase encoding method. This can be achieved by employing an iteration method in the CGH encoding process.

Generally, various iteration methods have been described in the literature. The best-known one is the iterative Fourier transformation algorithm according to Gerchberg and Saxton, which has been described in numerous publications, and which forms the general basis for most iteration methods. According to that method, a transformation and a back-transformation are performed repeatedly between a given function and its Fourier transform, and the deviation from the set-point values are minimised in each step in the two functions by taking advantage of degrees of freedom. The transformations are performed for example between the plane of a light modulator and the reconstruction plane of a two-dimensional object. Often the intensity distribution in the object plane is intended to reach a certain value in the reconstruction while the phases of the complex values can be chosen freely and are adapted in order to reduce the error. A complete elimination of the reconstruction errors of 3D scenes cannot be achieved this way though.

An iteration method for a hologram of a three-dimensional object has become known in the document "Interactive application in holographic optical tweezers of a multi-plane Gerchberg-Saxton algorithm for three-dimensional light shaping" by Gavin Sinclair et al. The object is sliced into multiple object planes. The complex actual values of the encoded hologram are transformed one after another into each of the individual object planes. In each of those planes the complex actual values are compared with the complex set-point values, and the absolute value of the actual values is replaced with the absolute value of the set-point values. The values which are back-transformed into the hologram plane are then summed up for encoding. Due to the large number of object planes and the many transformations between the individual object planes and the hologram plane, the computational load increases greatly.

In addition to the high computational load, the known methods also exhibit the disadvantage that for their use in a holographic display device certain conditions must be fulfilled precisely, which is not always feasible in practice. This is why a complete elimination of all above-mentioned influences which cause reconstruction errors is very difficult. There will always be a significant remaining error, so that high-quality reconstructions cannot be realised in holographic display devices without applying a correction method.

SUMMARY OF THE INVENTION

The object of the present invention is to improve the reconstruction quality in a holographic imaging display, where the wave front that results from a 3D scene in the visibility region is encoded directly on a phase modulator. At the same time, the control values for phase encoding shall be improved by way of a modified iterative computation, which can also be applied to phase encoding with a larger number of components.

The object is solved according to this invention by a holographic imaging display with
at least one illumination means for generating a sufficiently coherent illuminating wave front,
at least one phase modulator on to which control values, which must be found, for reconstructing the wave front of a three-dimensional scene (3D scene) are written,
a imaging system for the imaging and/or Fourier transformation of wave fronts, and
a processor
for computing the complex-valued reference wave front of the 3D scene in a visibility region of an observer plane,
for executing an iterative Fourier transformation algorithm, using which the control values for the phase modulator are found, and
for controlling the phase modulator with the found control values,
characterised in that the imaging system
comprises at least two imaging means, where a first imaging means for imaging the illumination means and for Fourier transforming actual wave fronts which are modulated in the phase modulator is followed by a second imaging means, which
serves as a screen, where the plane of the screen is a Fourier transformation plane for the computations with the iterative Fourier transformation algorithm, and where the plane of the phase modulator is the other Fourier transformation plane, and
is provided for imaging the wave front which is encoded with the control values into the visibility region, and
further comprises a filter whose aperture or an image of the aperture defines in the plane of the screen a transformation area, which comprises the complex values of the reference wave front of the 3D scene to which the complex values of the actual wave fronts transformed by the phase modulator are approximated by way of iterative computation using the Fourier transformation algorithm.

According to a first embodiment of a transmissive imaging display, the first imaging means is represented by a transformation lens, which is disposed next to the phase modulator.

The plane of the phase modulator and the plane of the screen are transformation planes required to be able to perform transformations for the iterative computation of the control values for the encoding. The transformation relations for the computation between them can preferably be Fourier transformations or Fresnel transformations.

In this document, the term 'transformation' shall generally include any transformation which is suitable for propagating light waves optically. As is commonly known, a Fresnel transformation can be split up mathematically into a multiplication with a first phase factor, a Fourier transformation and a multiplication with a second phase factor. If an iterative computation is to be performed for example between two planes which are related by a Fresnel transformation, the set-point values in the transformation area can be computed by the first phase factor so as to get modified set-point values before the iteration, and the control values on the phase modulator can be modified by the second phase factor after the iterative computation so that for the iterative computation itself only Fourier transformations will be necessary in each iteration step.

According to a second embodiment, an optical element for generating an illuminating wave front which preferably is incident on the phase modulator as a plane wave front is disposed in front of the first imaging means.

According to a third embodiment, a third imaging means is disposed between the first and the second imaging means for imaging the filter aperture onto the second imaging means.

According to a fourth embodiment, the imaging display is of a reflective type and comprises a reflecting screen, which has a centrally arranged light-absorbing region which serves as a filter.

According to the first and second embodiments, the plane of the screen comprises the filter which represents the transformation area for realising the iterative computation, while the transformation area in the third embodiment is realised by an image of the filter in the plane of the screen as an alternative embodiment of the invention.

The complex-valued reference wave front in the visibility region, said wave front being computed by the processor, exists both in the screen plane, with complex set-point values computed by way of Fourier transformation, and in the phase modulator, with computed phase values, whereby the phase values are the initial values for the iterative computations of the control values for encoding in the phase modulator.

The object is further solved by a method for reconstructing a three-dimensional scene (3D scene) in a holographic imaging display where a sufficiently coherent illuminating wave front emitted by at least one illumination means illuminates at least one phase modulator, where at least two imaging means of a imaging system image and/or Fourier transform modulated wave fronts, and where a processor computes the complex-valued reference wave front of the 3D scene in a visibility region and stores said wave front, and computes with the help of an iterative Fourier transformation algorithm control values for controlling the phase modulator, where according to this invention actual wave fronts of the 3D scene which are modulated by the phase modulator are Fourier transformed by a first imaging means into the plane of a second imaging means, which is at the same time the plane of the screen and a transformation plane of the iterative Fourier transformation algorithm, a filter of the imaging system defines in the transformation plane a transformation area in which the complex values of the actual wave fronts, which are transformed by the phase modulator, are approximated by way of the iterative computation with the Fourier transformation algorithm to the complex values of the reference wave front, which are computed by the processor, in order to find the control values, and the second imaging means images the wave front which is encoded with the found control values into the visibility region.

Another process step is that the complex-valued reference wave front, which is computed by the processor, is first transformed into the plane of the screen in order to get set-point values for the iteration in the plane of the screen.

Secondly, a number of k phase values are determined for each complex value from the complex-valued reference wave front by way of a phase encoding, said phase values being used as initial values for the iterative computation of the control values of the encoding in the phase modulator, where k is a numeral factor larger than 1. Then, the iterative computation of the control values is performed in repeated iteration steps between the plane of the screen and the plane of the phase modulator and it is stopped when a defined stop criterion is reached, and the thus corrected wave front is encoded on the phase modulator with the lastly computed phase values.

Each iteration step therein comprises the following procedure:

transformation of k·N phase values in the form of complex numbers with an absolute value of 1 from the plane of the phase modulator into the plane of the screen, resulting in k·N complex actual values in this plane, value comparison of the N complex actual values with the N complex set-point values of the wave front inside the screen with respect to a defined stop criterion, modification of the k·N complex values in the plane of the screen by way of replacing the N complex actual values inside the screen with the N complex set-point values and taking over the (k−1)·N complex actual values outside the screen without any modification, performance of a back-transformation of the k·N modified values into the plane of the phase modulator, in order to get k·N complex actual values in this plane, and modification of the k·N complex actual values in the plane of the phase modulator by setting the absolute values to 1 and taking over the phase values without any modification.

According to individual embodiments of the method, the value comparison inside the screen is performed on the basis of a defined stop criterion after each step of iteration or alternatively after a defined number of iteration steps.

One embodiment of a stop criterion is that the mean deviation between set-point values and actual values of all N values inside the screen falls below a defined threshold.

Another embodiment is that the maximum deviation between set-point values and actual values which occurs with one of N values inside the screen falls below a defined threshold.

Phase encoding is preferably performed in the form of two-phase encoding according to the method. The reconstruction of the 3D scene in a visibility region can be seen in a reconstruction volume. For this, at least one observer eye must be in an eye position in the visibility region in the observer plane of the holographic imaging display. The reconstruction volume is a pyramid-shaped volume, where the top of the pyramid lies in the centre of the visibility region and the edges run through the corner points of the screen and continue beyond the screen.

It is defined by the encoding whether the reconstructed 3D scene is visible optionally inside the volume between the visibility region and phase modulator and/or beyond the phase modulator.

An improvement of the reconstruction quality of the display is achieved for a directly encoded wave front with the reconstruction method which is realised according to the invention in a holographic imaging display and which includes a correction of the encoding.

BRIEF DESCRIPTION OF THE DRAWINGS

Holographic imaging displays which realise the reconstruction method according to this invention will be explained in detail below. The individual Figures are schematic diagrams, wherein.

DETAILED DESCRIPTION

Figure 1:
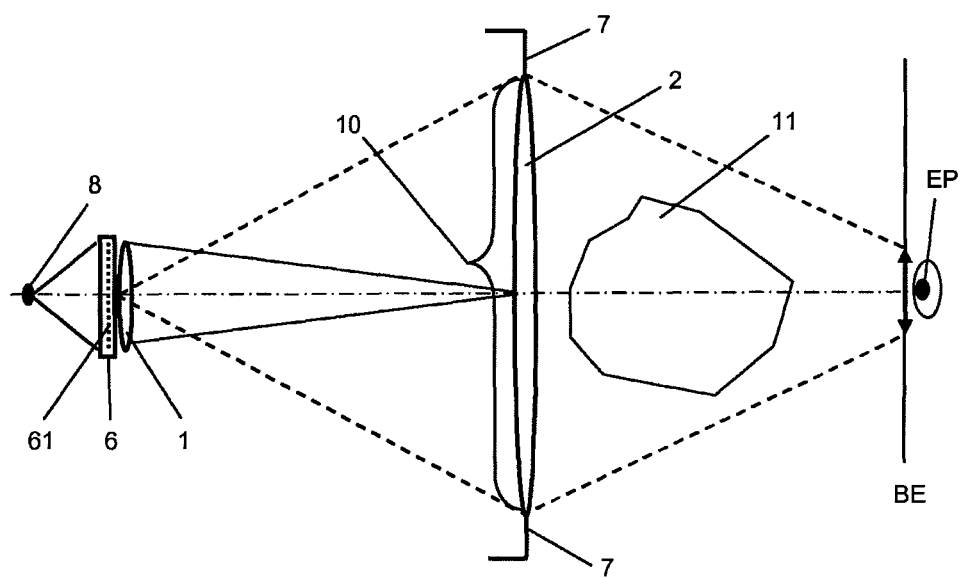
FIG. 1 shows a first embodiment of a holographic imaging display.
Figure 2:
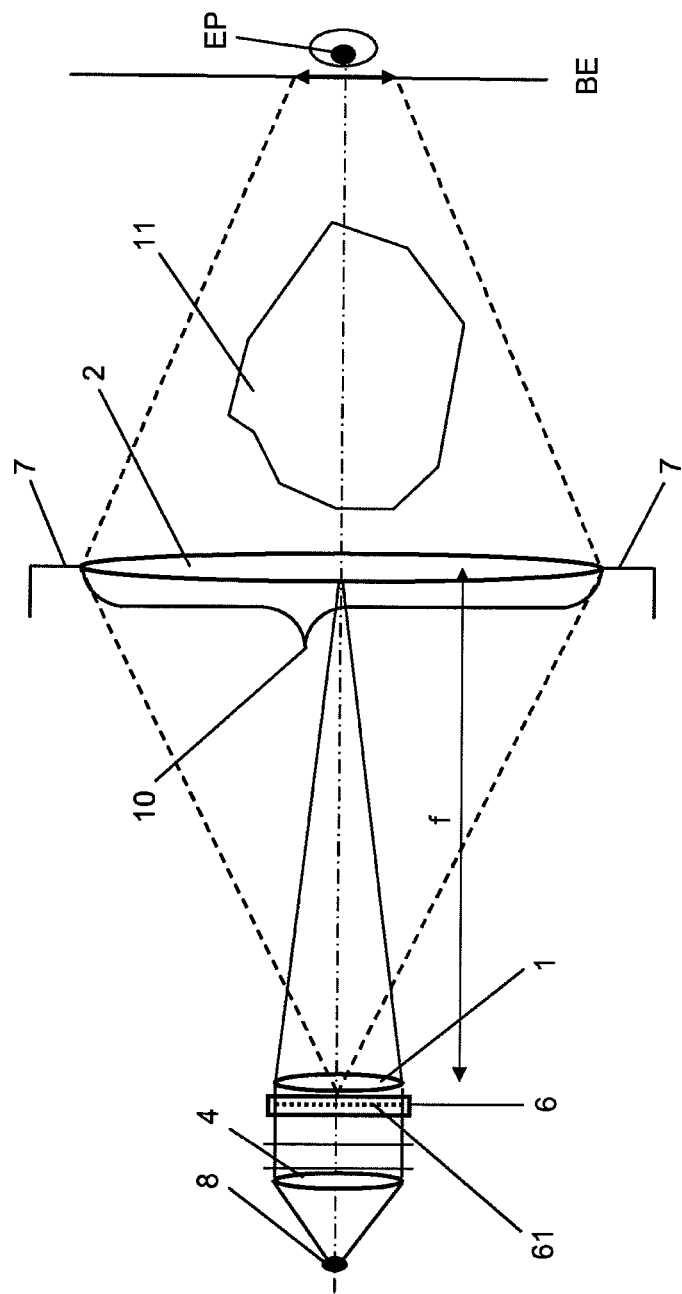
FIG. 2 shows a second embodiment of a holographic imaging display.
Figure 3:
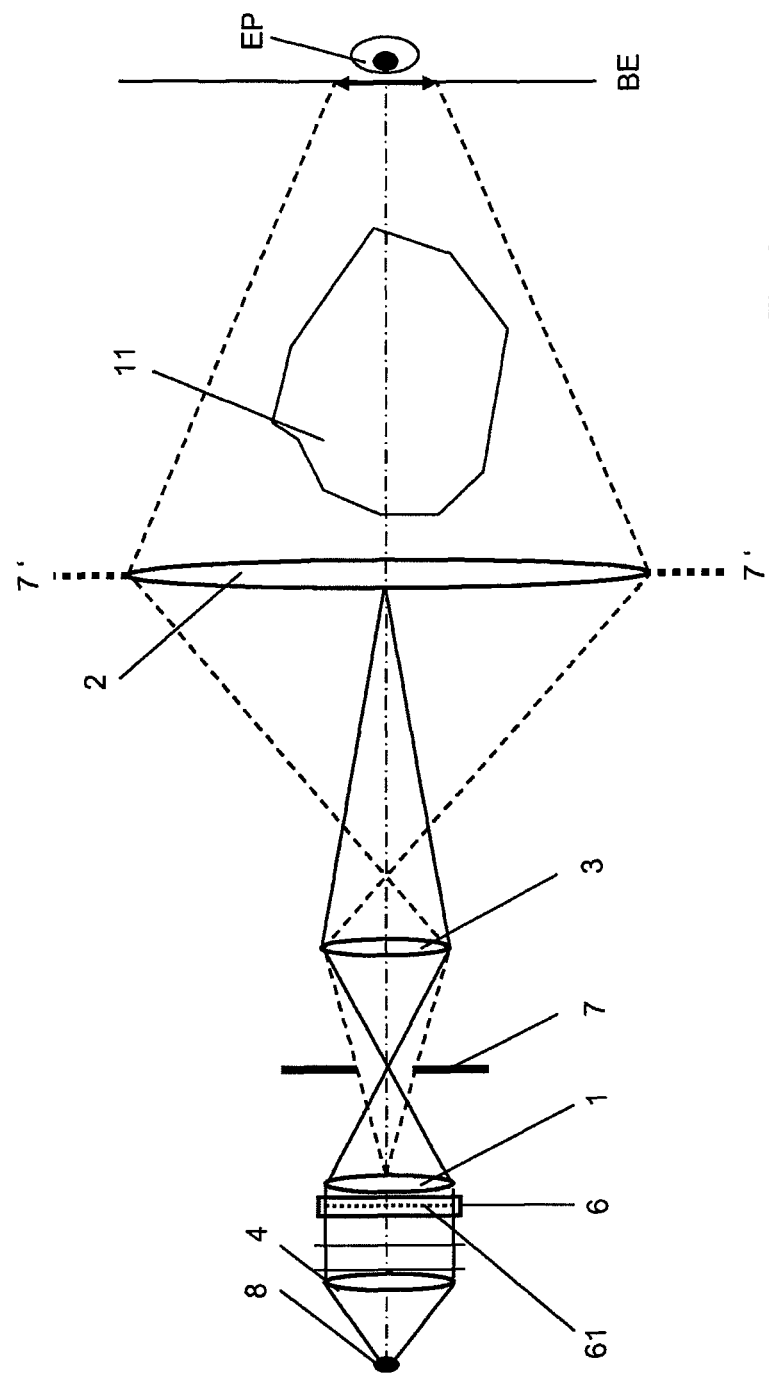
FIG. 3 shows a third embodiment of a holographic imaging display.
Figure 4:
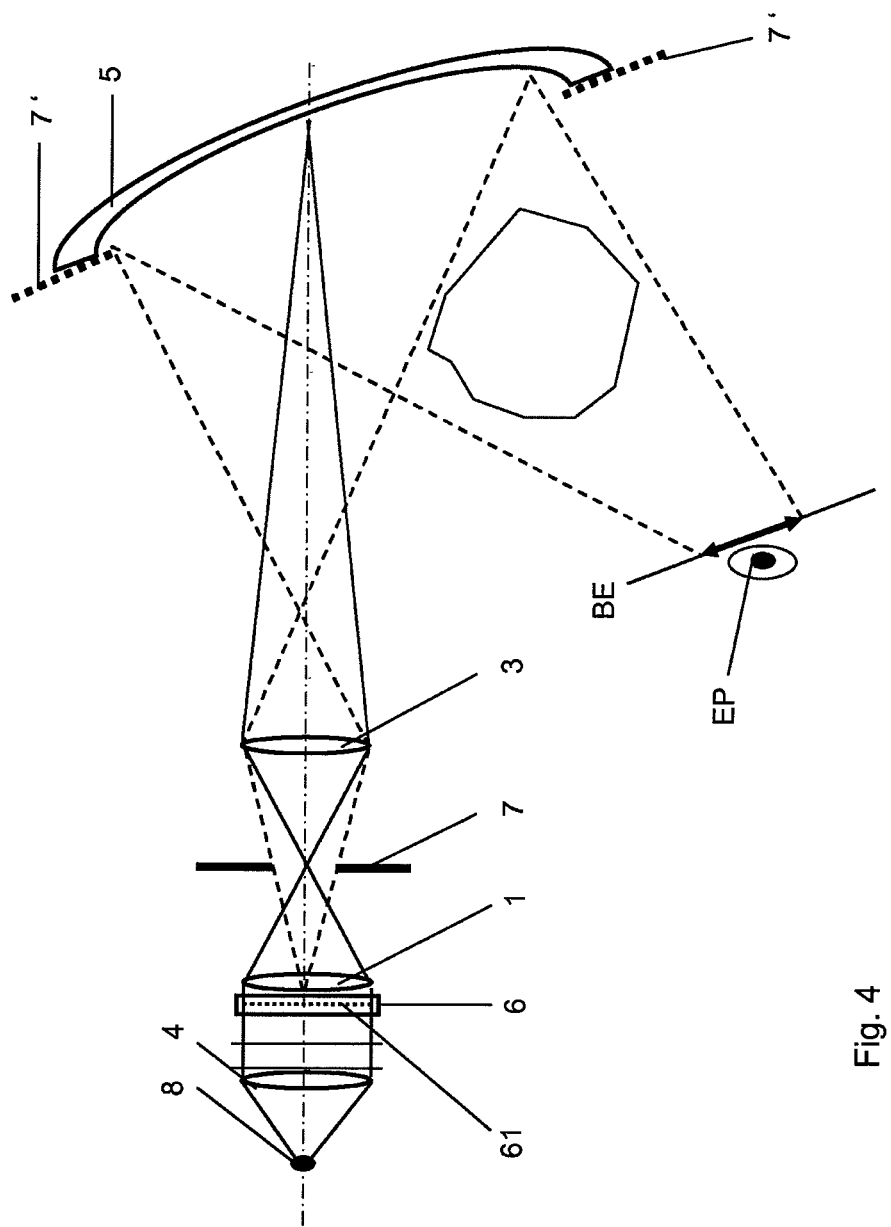
FIG. 4 shows a fourth embodiment of a holographic imaging display.

FIGS. 1 to 4 are top views, each of which shows the imaging of a directly encoded wave front of the 3D scene in a visibility region in an observer plane, where FIGS. 1 to 3 illustrate the imaging in a transmissive imaging display, and FIG. 4 illustrates the imaging in a reflective imaging display. For these and similar imaging arrangements, the control values for the encoding are found with the help of an iterative computation according to the diagram shown in FIG. 5.

Referring to FIG. 1, a first embodiment of a holographic imaging display comprises an illumination means 8, a phase modulator 6, and, directly next to the latter, a first imaging means 1, seen in the direction of light propagation. The first imaging means 1 images the illumination means 8 onto the second imaging means 2, which represents the screen of the imaging display at the same time. An observer plane BE, which follows the screen, comprises the visibility region with an eye position EP. The second imaging means 2 images the phase modulator 6 into the visibility region.

The plane of the screen comprises a filter 7 which forms a transformation area 10 in this transformation plane with its aperture. The plane of the phase modulator 6 represents the other transformation plane for the iterative computation of the control values of the wave front to be encoded.

FIG. 2 shows a second embodiment of a holographic imaging display, where, in addition to FIG. 1, an additional optical element 4 is disposed in front of the phase modulator 6. This element causes the illuminating wave front to pass the phase modulator 6 in the form of collimated light. In that case, the second imaging means 2 lies in the focal plane of the first imaging means 1. The additional optical element 4 improves the imaging quality.

The third embodiment of a holographic imaging display, which is shown in FIG. 3, is a modification of the one shown in FIG. 2. Here, an intermediate image of the phase modulator 6 is realised by a third imaging means 3. Between the first imaging means 1 and the third imaging means 3 there is disposed a filter 7 whose aperture the imaging means 3 images in an enlarged manner into the plane of the screen, so as to define the visible screen area. The second imaging means 2 is further used to transform the encoded wave front into the visibility region in the observer plane, so that the reconstruction 11 can be seen from there.

Referring to FIG. 4, the fourth embodiment of a holographic imaging display comprises instead of the transmissive screen of FIG. 3 a reflective optical element 5 as a screen. The aperture of the filter 7 is imaged by the third imaging means 3 onto the screen and thereby defines the visible screen area as the transformation area 10 for the complex-valued set-point values. The transformation area 10 can also be confined such that a margin area of the screen is made to be a light absorbing area so as to serve as a filter. The wave front encoded on the phase modulator 6 is imaged by the third imaging means 3 into an intermediate image plane. From there, the reflective screen images the wave front into the visibility region in the observer plane BE, where the eye position EP lies for reconstructing the wave front of the 3D scene.

Figure 5:
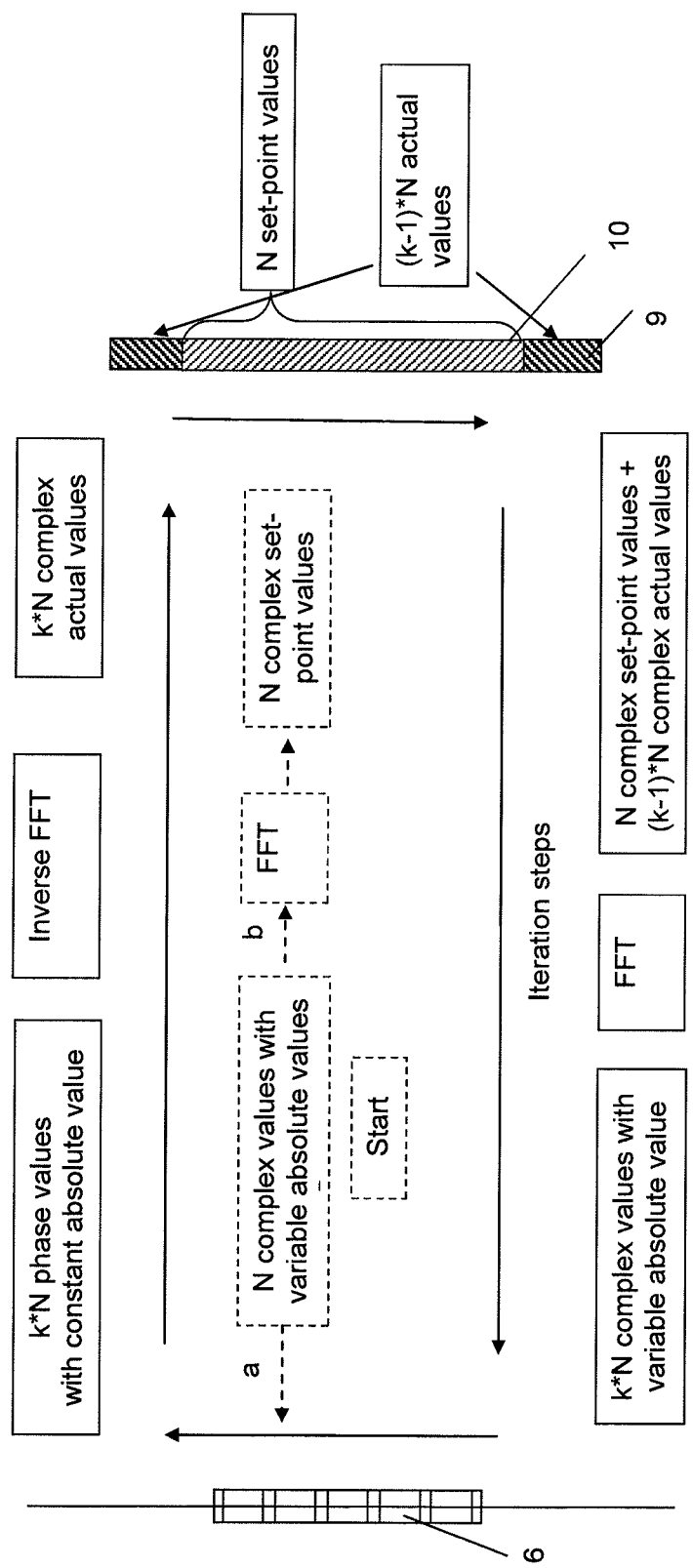
FIG. 5 is a schematic diagram showing a Fourier transformation algorithm between the plane of the modulator and the plane of the screen for correcting the encoding with repeated iteration steps.

FIG. 5 shows schematically the workflow of the iterative computation for correcting the control values for encoding a wave front of a 3D scene on the phase modulator 6. It shows a Fourier transformation algorithm with individual iteration steps between the plane of the phase modulator 6 and the plane of the screen, which is here represented by the second imaging means 2, with the transformation areas (9, 10). Beginning with the Start box, with the broken line, which marks the start of the iterative computation, the initial phase goes in the direction a for determining the phase values and in the direction b for transforming the N complex set-point values as a distribution of set-point values in the visible area of the screen. The subsequent iteration steps are indicated by solid arrows. A special form of the Fourier transformation, the fast Fourier transformation (FFT) is used here.

Figures 6A, 6B:
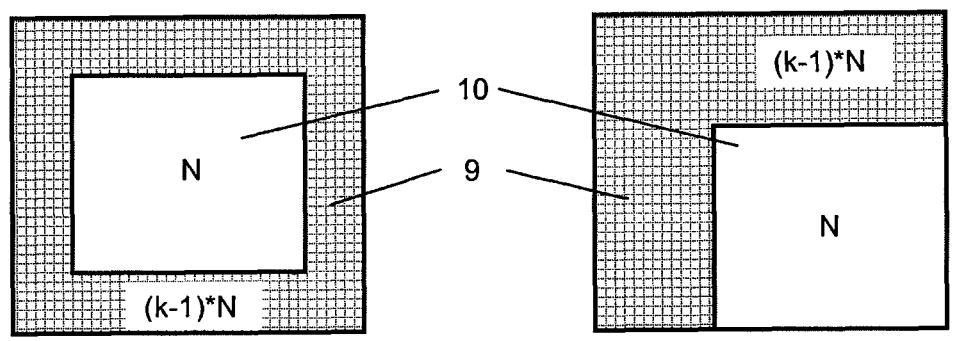
FIG. 6a, 6b shows two possible positions of the transformation area of complex set-point values in the transformation area of complex actual values.

FIGS. 6a and 6b show two possible positions of the visible screen area, representing the transformation area 10 inside the transformation area 9 for value comparison of the set-point values with the complex actual values. Any other position is possible as well.

All four embodiments are based on the same components: Data sets, which are stored in a processor (not shown), of the 3D scene which is sliced into multiple two-dimensional object planes (not shown in detail, but mentioned above briefly); a visibility region in an observer plane BE, from where an observer at an eye position EP can see the reconstruction 11 in front of a screen; and a phase encoding process which can be optimised iteratively with a Fourier transformation algorithm, for encoding the wave front of the 3D scene on at least one phase modulator 6 of a holographic imaging display which comprises a projection imaging system. The screen can either be of a transmissive or of a reflective type, and it can be realised optionally by a diffractive or refractive optical means.

The method for encoding and reconstructing a wave front of a 3D scene according to the invention will be described in detail below with reference to FIG. 1.

An illumination means 8 which emits sufficiently coherent light generates an illuminating wave front, which is incident on a phase modulator 6. A first imaging means 1 images the wave fronts which are modulated in phase modulator 6 into a plane of a screen. The screen is a second imaging means 2. The control values, which have been found in an iterative Fourier transformation algorithm, and which are written to the phase modulator 6, generate a wave front 61 of the 3D scene. The second imaging means 2 images the wave front 61 into a visibility region in an observer plane BE, which is illustrated by double arrows in the Figure. An observer eye in the eye position EP can see from here the reconstruction 11 of the 3D scene in a reconstruction volume. The first imaging means 1 is at the same time the transformation lens for transforming the wave fronts.

In order to determine the control values for encoding as precisely as possible, an iterative Fourier transformation algorithm is integrated in order to compute the control values. The two transformation planes which are necessary for the computation are the plane of the phase modulator 6 and the plane of the screen. A filter 7 is disposed in the plane of the screen, outside the second imaging means 2, and the aperture of the filter 7 confines the visible screen area. The visible screen area represents at the same time the transformation area 10, which comprises N complex set-point values of the reference wave front, and which lies inside the transformation area 9 (cf. FIGS. 6a, 6b). The (k−1)·N actual values of the transformed wave front lie outside the visible screen area.

Referring to the flow chart in FIG. 5, the workflow of the iterative computation will now be described.

The N complex values of the object data sets of the 3D scene are transformed into the visibility region in the observer plane 7 e.g. as Fresnel transforms, where they are summed up. This means that in the visibility region the wave front is computed for each object plane, and all of them are summed up so as to form an aggregated complex-valued reference wave front which comprises the information of all transformed object planes. However, other methods for generating a reference wave front may be employed as well. This computation of the common complex-valued reference wave front is carried out in a processor (not shown), which also executes the iterative Fourier transformation algorithm.

The N complex values with variable absolute value of the reference wave front which are computed in the visibility region are encoded on the phase modulator 6 with the help of the two-phase encoding method as phase values, indicated by the direction a and the broken arrow in FIG. 5, on the one hand. On the other hand, the N complex values are transformed into the transformation area 9 in the plane of the screen as set-point values for the value comparison in the course of the iterative computation, indicated by the direction b in FIG. 5. The N complex set-point values include both the amplitude and the phase values, because both values are required for an error-free reconstruction of a 3D scene. The complex actual values are replaced with the complex set-point values inside the visible screen area, where the phase values and the amplitude values are always replaced in each iteration step.

Because each complex value for two-phase encoding is represented by two phase values, as described above, there are 2·N phase values with a constant absolute value, for example the absolute value 1, as a result of the encoding process. Therefore, 2·N complex values with the absolute value 1 are provided as initial values for the iterative computation. Because the number of phase values can also be larger than two, the component k is generally used in FIG. 5 to denote the number of phases.

First, there is a back-transformation of the computed k·N phase values with a constant absolute value into the plane of the screen with the transformation area 9. These phase values are the actual values, which currently exist in the hologram plane, or in the plane of the phase modulator 6. The back-transformation (FFT) produces k·N complex actual values. A value comparison is carried out of those N complex actual values which lie inside the transformation area 9 and those N set-point values which lie in the transformation area 10.

After the value comparison, the N complex actual values which lie inside the screen area are replaced with the N complex set-point values, while the (k−1)·N complex actual values which lie outside the screen area of the transformation area 9 will be taken over without any modification for the next transformation. All complex actual and set-point values which exist in this transformation plane are transformed into the plane of the phase modulator 6. As the result of the transformation, there will be k·N complex values with a variable absolute value in that plane.

In that plane, the absolute values of all k·N complex values are set to 1, and the phases of the actual values remain unchanged.

As a result, there are k·N complex values with constant absolute value again, and another iteration step can begin.

The workflow described above is repeated until a defined stop criterion is reached. The stop criterion is defined in a comparison means such that an approximation to the set-point values is achieved with a desired accuracy, but without causing too much computational load. Various parameters can be used to define the stop criterion. The value comparison with the help of the defined stop criterion can alternatively be conducted after each iteration step or always after a given number of iteration steps.

With each iteration step, the deviation of the complex actual values from the complex set-point values is minimised in the plane of the screen, and the deviation of the complex values from the constant absolute value is minimised in the plane of the phase modulator 6. The control values for encoding are thereby continuously improved. For executing the method, they are converted into control signals in a processor and encode the wave front according to the lastly computed phase values, which correspond with object data sets of the 3D scene. With the help of these data sets which are encoded on the phase modulator 6, a precise holographic reconstruction 11 of the 3D scene can be generated from an accordingly controlled illuminating wave front. In the visibility region, an observer, whose eye position EP is detected with known position detection systems, can see the holographic reconstruction 11.

Both the amplitude values and the phase values are important for the reconstruction of the wave front of the 3D scene. This is why in each iteration step inside the screen area both the amplitude and phase of the complex actual values are replaced with the amplitude and phase of the complex set-point values. The computed complex actual values in the transformation area 9 outside the screen area are taken over without any modification for further transformations.

The iterative computation can alternatively be applied to a one-dimensional computation—e.g. horizontal-parallax-only holograms—or to a two-dimensional computation—full-parallax holograms. In the one-dimensional case it is sensible to perform the iterative computation separately for one-dimensional arrangements of pixels, e.g. for each line of the hologram.

In particular in the two-dimensional case, a spatial arrangement of the k phase values for each complex value optionally in horizontally and/or vertically adjacent pixels of, the phase modulator 6 is possible, and the iterative computation of the control values can be performed in an according arrangement.

An advantage of using the transformation area for computing the transformations is that the number of computing operations is reduced compared with known methods. For example, fewer Fourier transformations are executed, which is why the iteration steps until a defined stop criterion is achieved can be performed more quickly because despite the fact that a spatially extended 3D scene is reconstructed, the iterative computation is only performed between two planes.

For the holographic reconstruction of the 3D scene, object information is available in the form of the found control values for encoding which are very well approximated to the 3D scene thanks to the inventive method. The control values for encoding are improved with the help of the iterative computation process described above, and the phase code used is optimised in a converging manner. A wave front which is computed and encoded according to the present invention improves the quality of the reconstruction of a 3D scene. It is thus also possible to realise in a holographic imaging display a spatial separation between stray light (noise) and useful signal in a simple manner.

When encoding a wave front of a colour 3D scene in a holographic imaging display, the iterative computation of the phase values is carried out separately for each of the primary colours. Typically, red, green and blue are used as primary colours. However, other combinations are thinkable as well.

A colour wave front can be composed of partial wave fronts of the individual primary colours (red, green, blue). This can be achieved in the phase modulator 6 for example by a spatial separation of each primary colour, or by time sequential display of partial wave fronts of each primary colour. A partial wave front is to be understood as a monochrome wave front of the 3D scene. The iterative optimisation of the control values of the phase modulator 6 is here carried out separately for each primary colour. In the case of a spatial separation, a precondition is that each pixel comprises sub-pixels of the three primary colours, or that large individual regions on a phase modulator are used for the individual primary colours, or that a combination of multiple phase modulators is used.

At the beginning of the iterative computation, or prior to the first transformation, it can preferably be achieved by varying the distance of each object data set from the observer plane that parts of, or the entire reconstruction of, the 3D scene is visible both in front of and behind the screen, or that the 3D scene is simultaneously reconstructed in both these spatial regions. This way, a natural position of the reconstruction in the depth of the space in front of the eyes of an observer is achieved, and the depth of the reconstruction can be amplified or reduced deliberately by way of adequate software settings.

In order to be able to perceive the holographic reconstruction in a true three-dimensional manner in the visibility region, as if the 3D scene was viewed in reality, individual reconstructions are needed for the left and right eye in separate visibility regions of like size. Both reconstructions are computed using the same method, but with different object data sets, because of the different positions of the right and left eyes of the observer in relation to the 3D scene. The respective wave fronts can be computed at the same time and absolutely independently of each other in accordingly equipped multi-channel digital processors with simultaneously executed transformation routines.

The iterative computation which is integrated into a holographic imaging display has the advantage that the error term of the Fourier transformations can be reduced uniformly in combination with the phase encoding. This makes it possible to present the reconstruction without errors in the region where the observer eyes are situated. By defining the size of a transformation area, there are preferably available more degrees of freedom for improving the control values in the transformation area.

The targeted replacement of the found actual values with the given set-point values in the individual iteration steps results in a high-quality reconstruction, without the need to consider each object plane, where controllable values are generated for the pixels of the phase modulator from the originally existing complex values of the 3D scene.

REFERENCE NUMERALS

1 First imaging means
2 Second imaging means
3 Third imaging means
4 Optical element
5 Reflective optical element
6 Phase modulator
61 Wave front
7 Filter
8 Illumination means
9 Transformation area with actual values
10 Transformation area with set-point values
11 Reconstruction
BE Observer plane
EP Eye position
k Component for phase values
FT Fourier transform
FFT Fast Fourier transform

The invention claimed is:

1. A holographic imaging display, comprising:
at least one illumination means for generating a sufficiently coherent illuminating wave front,
at least one phase modulator on to which predetermined control values for reconstructing the wave front of a three-dimensional scene (3D scene) are encoded;
an imaging system for the imaging and/or Fourier transformation of wave fronts; and
a processor
for computing the complex-valued reference wave front of the 3D scene in a visibility region of an observer plane,
for executing an iterative Fourier transformation algorithm, using which the control values for the phase modulator are found, and
for controlling the phase modulator with the found control values, the imaging system comprising:
at least two imaging means, where a first imaging means, for imaging the illumination means and for Fourier transforming actual wave fronts which are modulated in the phase modulator, is followed by a second imaging means, which serves as a screen, where the plane of the screen is a Fourier transformation plane for the computations with the iterative Fourier transformation algorithm, and where the plane of the phase modulator is the other Fourier transformation plane, and is provided for imaging the wave front which is encoded with the control values into the visibility region; and
a filter whose aperture or an image of the aperture defines in the plane of the screen a transformation area, which comprises the reference wave front defined by N complex values of the 3D scene to which the complex values of the actual wave fronts transformed by the phase modulator are approximated by way of iterative computation using the Fourier transformation algorithm.

2. A holographic imaging display according to claim 1, wherein the first imaging means is a transformation lens which is disposed next to the phase modulator.

3. A holographic imaging display according to claim 1, wherein the filter is disposed in the plane of the screen and where the screen represents the aperture of the filter.

4. A holographic imaging display according to claim 1, wherein the image of the filter is disposed in the plane of the screen.

5. A holographic imaging display according to claim 1, wherein the Fourier transformations are substituted by Fresnel transformations.

6. A holographic imaging display according to claim 1, wherein an optical element for generating an illuminating wave front which is incident on the phase modulator as a plane wave front is disposed in front of the first imaging means.

7. A holographic imaging display according to claim 1, wherein a third imaging means for imaging the filter aperture on to the second imaging means is disposed between the first and the second imaging means.

8. A holographic imaging display according to claim 1, wherein the second imaging means is a reflective optical element which represents the screen and which has margin areas which absorb light so as to have the effect of a filter, thus confining the visible screen area.

9. A holographic imaging display according to claim 1, wherein the complex-valued reference wave front, which is computed by the processor, exists both in the screen plane, with complex set-point values computed by way of Fourier transformation, and in the phase modulator, with computed phase values, where the phase values are the initial values for computing the control values for encoding using the iterative Fourier transformation algorithm.

10. A method for reconstructing a three-dimensional scene (3D scene) in a holographic imaging display comprising:
illuminating at least one phase modulator with a coherent illuminating wave front of at least one illumination means;
imaging and/or Fourier transforming modulated wave fronts with at least two imaging means of a imaging system;
computing and storing, with a processor, the complex-valued reference wave front of the 3D scene in a visibility region;

computing, with said processor and an iterative Fourier transformation algorithm, control values for controlling the phase modulator;

Fourier transforming actual wave fronts of the 3D scene which are modulated by the phase modulator by a first imaging means into the plane of a second imaging means, which is at the same time the plane of the screen and a transformation plane of the iterative Fourier transformation algorithm;

defining in the transformation plane, using a filter of the imaging system, a transformation area in which the complex values of the actual wave fronts, which are transformed by the phase modulator, are approximated by way of the iterative computation with the Fourier transformation algorithm to the complex values of the reference wave front, which are computed by the processor, in order to find the control values; and imaging, using the second imaging means, the wave front which is encoded with the determined control values into the visibility region.

11. A method according to claim 10, wherein the complex-valued reference wave front defined by N complex values is on the one hand transformed into the plane of the screen, in order to provide complex set-point values inside the visibility region there, and where it is on the other hand imaged onto the phase modulator in order to determine a number of k phase values for each complex value on the phase modulator by way of phase encoding as initial values for the iterative computation of the control values for encoding, where k is a numeral factor which is larger than 1, and where the total number of phase values corresponds with the number of pixels of the phase modulator.

12. A method according to claim 11, wherein the reconstructed 3D scene is visible from an eye position (EP) optionally inside a reconstruction volume between the visibility region and the phase modulator and/or beyond the phase modulator.

13. A method according to claim 10, wherein the iterative computation of the control values is performed in repeated iteration steps between the plane of the screen and the plane of the phase modulator, and where it is stopped when a defined stop criterion is reached, and where the wave front is encoded on the phase modulator with the lastly computed phase values as control values, and where the encoding is carried out either one-dimensionally or two-dimensionally.

14. A method according to claim 13, wherein each iteration step comprises the following procedure:

transformation of k·N phase values in the form of complex numbers with an absolute value of 1 from the plane of the phase modulator into the plane of the screen, resulting in k·N complex actual values in this plane, value comparison of the N complex actual values with the N complex set-point values of the wave front inside the screen with respect to a defined stop criterion, modification of the k·N complex values in the plane of the screen by way of replacing the N complex actual values inside the screen with the N complex set-point values and taking over the (k−1)·N complex actual values outside the screen without any modification, performance of a back-transformation of the k·N modified values into the plane of the phase modulator, in order to get k·N complex actual values in this plane, and modification of the k·N complex actual values in the plane of the phase modulator by setting the absolute values to 1 and taking over the phase values without any modification.

15. A method according to claim 14, wherein the value comparison inside the screen is performed on the basis of a defined stop criterion alternatively after each iteration step or after a defined number of iteration steps.

16. A method according to claim 10, wherein the phase encoding for computing the initial values is a two-phase encoding.

17. A method according to claim 16, wherein a complex value of the reference wave front is represented on the phase modulator by k=4 pixels, and where two phase values which are computed by way of two-phase encoding are encoded crosswise in two adjacent columns and rows of the phase modulator as initial values.

* * * * *